Patented Feb. 20, 1923.

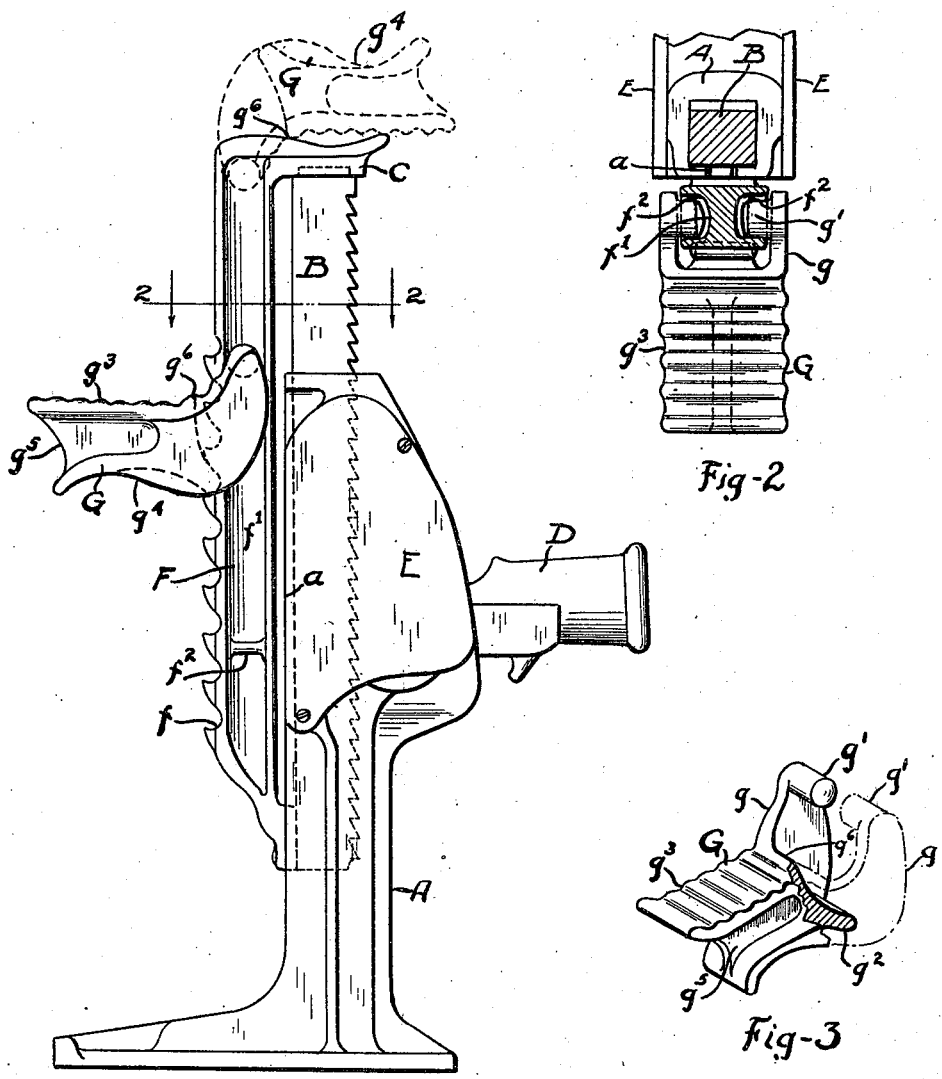

1,446,112

UNITED STATES PATENT OFFICE.

EDMUND C. BATES, OF ALLIANCE, OHIO, ASSIGNOR TO THE BUCKEYE JACK MANUFACTURING COMPANY, OF ALLIANCE, OHIO, A CORPORATION OF OHIO.

LIFTING JACK.

Application filed October 15, 1920. Serial No. 417,271.

*To all whom it may concern:*

Be it known that I, EDMUND C. BATES, a citizen of the United States, residing at Alliance, in the county of Stark and State of Ohio, have invented a certain new and useful Improvement in Lifting Jacks, of which the following is a full, clear, and exact description, reference being had to the accompanying drawings.

This invention relates to lifting jacks, and particularly those suitable for raising the axles of automobiles and other vehicles. The conditions under which such jacks are employed vary greatly, not only on account of different heights of axles, but also due to varying elevations of the road surface on which the jack is placed. The range of operation of the jack must accordingly be comparatively great, and at the same time the size of the jack must be kept small, for efficient use in connection with an automobile.

The object of this invention is to provide a jack which, while being small in compass, shall have a wide range of lifting heights, operating with efficiency on axles that are comparatively close to the ground and axles that are comparatively high above the ground, as well as at all intermediate elevations. In accomplishing this, I provide the raisable member of the jack with an extension device which may be held at the side of such raisable member as a step for low heights, or positioned on top of the raisable member as an extension, where the axle is high. The invention includes such a feature broadly and also the more specific means for carrying it out, as illustrated in the drawings and hereinafter more fully explained.

In the drawings, Fig. 1 is a side elevation of a jack embodying this invention; Fig. 2 is a cross-section thereof on the line 2—2 of Fig. 1; Fig. 3 is a perspective, partly broken away, of the movable step or extension.

In the drawings, A represents a suitable base member having a vertical guideway, in which is slidably mounted a rack bar B. At the upper end of this rack bar is a suitable seat C, which is formed for convenient engagement with either a round or flat bottomed axle, or with any bracket which may be attached to the brake drum or elsewhere for the convenient application of a jack. D indicates the socket of an oscillating handle for operating the jack. Suitable mechanism enables the oscillation of the handle to raise or lower the bar B, as will be understood. This mechanism may be of any approved type; it is located in a cavity in the base member behind a removable plate E.

The raisable member beside the bar B and the head C includes a vertical bar F connected with the head C (being preferably integral with it) and connected also with the lower portion of the bar B thru a slot A in the rear vertical edge of the base frame, as is shown and explained in my prior Patent No. 1,189,778, issued July 4, 1916. On the rear edge of this side bar F is formed a vertical series of teeth, or notches $f$, while in the sides of this bar $f$, are vertical grooves or recesses $f^1$. G indicates the movable step or extension; this is a block having a pair of arms $g$ extending onto opposite sides of the bar F, each arm having an inward projection $g^1$ which occupies one of the recesses $f^1$, thus pivotally and slidably connecting the block with the raising member of the jack. This block has a projection $g^2$ which may engage in any of the notches $f$.

It will be seen that the construction described provides a very efficient and readily adjustable side step adapted to receive and support an axle at various positions, which may be lower than the lowest position of the head C. To adjust the block up and down it is only necessary to tip it out slightly and raise or lower it manually as desired. The upper surface of the block is corrugated or roughened at $g^3$ to make a good receiving surface for the axle. When the block is used as a side step, the downward thrust of the axle is taken by the projection $g^2$ in the notch it occupies, and by a lateral thrust of the pins $g^1$ against the inner surface of the overhanging edge of the bar F behind the teeth, as shown in Fig. 2.

The same block G may also be used as an extension for the raising bar B when an extra high axle is to be raised. To effect this, it is only necessary to lift the block G to its highest position and turn it upside down when it rests on top of the head C in the position shown in the dotted lines $G^1$ in Fig. 1. In this position, the block extends substantially horizontally resting on the head C and presenting a concavity $g^4$ adapted to receive the axle or bracket.

When the block is in the inverted top position described it rests on the head C at the outer edge thereof, and also where the inner edge $g^6$ of the roughened surface of the block terminates, that is, where the arms spring from the body of the block. The vertical plane, however, thru the axle seat $g^4$ is preferably adjacent to the front edge of the rack bar B so that there is no tendency of the block to slip rearwardly.

The extension block G may be conveniently made of a malleable casting of the form shown, wherein the side arms $g$ are plate-like webs braced intermediately by the portion of the casting which forms the projection $g^2$. Between the load engaging surfaces $g^3$, $g^4$ of the block is preferably an intermediate vertical web $g^5$ providing strength and reducing the cross-section of the block so that it may be conveniently malleableized.

The block G is normally retained on the raising member by means of slight cross webs $f^2$ extending across the recesses $f^1$ just below the lowermost desired position for the projections $g^1$. These cross webs are more specifically intended to prevent the block G from dropping to the bottom of vertical bar F. This prevents interference of block G with the lower part of base A, allowing the full lowering advantage of rack bar B. It is preferably so placed as to prevent the projection $g^2$ passing below the lowest notch in bar F.

In assembling the jack, the block G as made has its projection made far enough apart so they may pass across and above the webs $f^2$. When above these webs the arms $g$, being malleable, are hammered slightly together, thus bringing them into the position shown in Fig. 2, where it will be seen they extend inward above the webs $f^2$. The side bar F, together with the head C, may be one integral malleable casting suitably secured to the raising bar B.

By reason of the combined step and extension, the jack provides three ranges of movement; namely, the side step for low heights, the head C for medium heights, and the step as a top extension $G^1$ for extra high lifts. This desirable result is accomplished without the sacrifice of compactness or simplicity, and the jack is adapted for economical manufacture.

Having thus described my invention, I claim:—

1. In a lifting jack, the combination of a base member, a raising member slidably guided therein, and an adjustable extension adapted to be held at the side of the raising member or on top thereof, as desired, with its normal load supporting surface in engagement with the load supporting surface of the upper member and having another face adapted to receive the load.

2. In a jack, a raising member and an extension pivotally and slidably connected with the raising member and adapted to extend to the side thereof as a side step, or be held on top thereof as a top extension and having a load supporting surface adapted to engage a load in each position, the surface which supports the load when the member is in side position, contacting with the top of the extension when in the upper position.

3. In a lifting jack, the combination of a base member, a vertical lifting member having its upper face curved to receive a load and slidably guided therein in said base and having a supplemental side member, and a block pivotally and slidably mounted on the supplemental member, and adapted to be held projecting from an intermediate part thereof or at the top thereof and having a surface curved to receive a load when in upper position.

4. In a lifting jack, the combination of a base member, a raising member slidably guided in the base member, a load receiving member mounted on the raising member, said load member being mounted for longitudinal and pivotal movement on the raising member, whereby it may be held at the side of the raising member or reversed to rest upon the top thereof if desired.

5. The combination of a base member, a raising member slidably mounted therein, mechanism for moving the raising member vertically with reference to the base member, a block pivotally and slidably connected with the raising member and adapted to be held at the rear of the raising member with one surface uppermost and at the top of the raising member with another surface uppermost to thereby form an extension of said raising member.

6. In a jack, the combination with a base member, of a raising member slidably guided therein, said raising member having a vertical row of supporting projections, an extension block movable on the raising member and having a projection adapted to coact with any of the projections in said vertical row to make a side step, said extension member having its under surface formed to receive a load and being adapted to be inverted onto the top of the raising member while it remains connected therewith and having its load supporting surface in contact with the top of said raising member.

7. In a jack, the combination with a base member, a raising bar slidably guided therein, a vertical supplemental bar connected with said raising bar, an extension member pivotally and slidably connected with the supplemental bar and being adapted to be held at the side thereof, or inverted and thereby positioned above the said raising bar, said extension having seats for the load on both its upper and under surface, one of the normally upper surfaces being in contact with the upper portion of said bar when the extension is inverted.

8. In a lifting jack, the combination with a base member, a lifting bar slidably guided therein, a vertical bar secured to the lifting bar and having teeth on its rear edge and vertical recesses in its sides, and a block having arms extending across the sides of said vertical bar, said arms having inward projections adapted to occupy the recesses, the block having a shoulder between the arms adapted to enter the spaces between the teeth mentioned whereby the block is slidably and pivotally connected to said bar, said recess extending adjacent the top of said bar to allow inversion of the block when adjacent the top of the bar, whereby the former load supporting surface thereof is brought into engagement with the top of the bar to allow the use of an additional load supporting surface of said block.

9. In a lifting jack, the combination with a base member, a lifting member having a portion with vertical recesses in its sides, and a block having arms extending crosswise of said recesses, said arms having inward projections adapted to occupy the recesses, means to adjustably position the block at the side of the lifting member, said block having load supporting surfaces on both its upper and under sides, and being adapted to swing over onto the top of the lifting member and be supported thereby.

10. In a jack, the combination of a base member, a raising bar slidably guided therein, an operating mechanism for raising the bar or lowering it, a supplemental bar at the rear of the raising bar connected with it, there being a head at the upper ends of the said bars, said supplemental bar having vertical recesses in its sides, and a movable block having arms overlapping said recesses, the arms having inward pins extending into the recesses, and the block having two load supporting surfaces, and being adapted to stand as a step at the rear of the bar or be inverted above the head at the top of the bar.

11. In a jack, the combination of a base member, a raising bar slidably guided therein, an operating mechanism for raising the bar or lowering it, a supplemental bar at the rear of the raising bar connected with it, said supplemental bar having vertical recesses in its sides, and a movable block having arms overlapping said recesses, the arms having inward pins extending into the recesses, and the block having two load supporting surfaces, and being adapted to stand as a step at the rear of the supplemental bar or be inverted above the top of the raising bar, the block having a projection which may engage a notch in the supplemental bar when the block is a side step, and said projection forming the end portion of the load support when the block is turned over onto the top of the raising bar.

In testimony whereof, I hereunto affix my signature.

EDMUND C. BATES.